Figure 1:
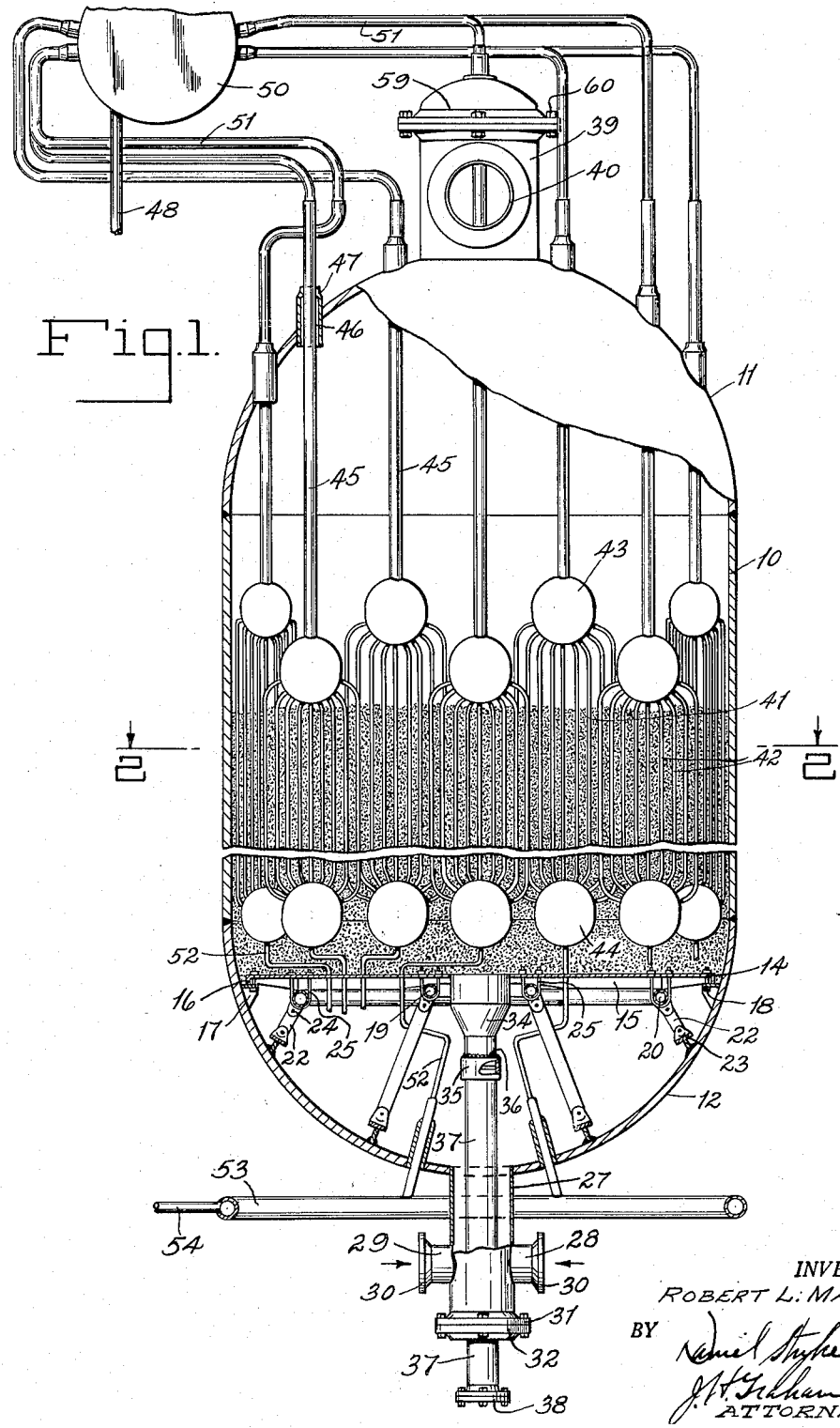

Dec. 29, 1953

R. L. MAYHEW 2,664,346

FLUID REACTOR

Filed June 22, 1950

3 Sheets-Sheet 1

INVENTOR.
ROBERT L. MAYHEW
BY
ATTORNEYS

Dec. 29, 1953　　　R. L. MAYHEW　　　2,664,346
FLUID REACTOR

Filed June 22, 1950　　　　　　　　　　3 Sheets-Sheet 2

INVENTOR.
ROBERT L. MAYHEW
BY
ATTORNEYS

Dec. 29, 1953 R. L. MAYHEW 2,664,346
FLUID REACTOR
Filed June 22, 1950 3 Sheets-Sheet 3

INVENTOR.
ROBERT L. MAYHEW
BY
ATTORNEYS

Patented Dec. 29, 1953

2,664,346

UNITED STATES PATENT OFFICE 2,664,346

FLUID REACTOR

Robert Louis Mayhew, Great Neck, N. Y., assignor to Hydrocarbon Research, Inc., New York, N. Y., a corporation of New Jersey Application June 22, 1950, Serial No. 169,700

7 Claims. (Cl. 23—288)

The present invention concerns contacting a gasiform reactant stream with a dense phase, fluidized, solid particle material in the form of a powder or the like for effecting a reaction involving a substantial thermal effect, and relates more particularly to a reactor effective to maintain more uniform contact between the gasiform reactant and the fluidized solid particles without the irregularities heretofore encountered. The reactor is particularly adapted to the dense fluid phase synthesis of hydrocarbons from hydrogen and carbon monoxide in the presence of a solid particle hydrocarbon synthesis catalyst, and therefore will be specifically described in terms of this operation.

The reactor of the present invention involves a vertically extending reaction vessel, provided internally with a multiplicity of independent, unitary, temperature-controlling tube bundles suspended in predetermined relationship in a pattern which effects uniform disposition of temperature-regulating tubes throughout the transverse section of the reaction zone to form vertically extending passageways therebetween for the catalyst and the reactant stream. In particular, each tube bundle derives independent and exclusive structural support from the above and is susceptible to independent removal in accordance with the ordinary repair and maintenance requirements.

To this end, each individual tube bundle comprises a pair of vertically spaced, substantially spherical upper and lower headers with a multiplicity of vertical water tubes therebetween. The transverse section of each bundle of tubes presents a hexagonal peripheral arrangement such that the several bundles nest together to form a uniform pattern of tube disposition across the reactor. The tubes are supplied via the lower header with a temperature-regulating fluid which thereby indirectly effects transfer of thermal energy to or from the surrounding catalyst phase.

An important feature of the invention involves effecting sole structural support of each bundle unit by suspension from the upper extremity of the reaction vessel through the medium of the conduit means for withdrawing the temperature-regulating fluid. This involves a tube extending vertically from the upper spherical header. In this manner, the entire weight of each tube bundle is carried as a vertical load upon the top of the reactor so that the tubes remain laterally in the predetermined pattern of orientation for substantially unrestrained vertical expansion and contraction without stressing the remainder of the structure.

The fluid phase of catalyst within the reactor is supported upon a perforated partition or grid, resting upon a suitable frame. Therefore, the reactant gases entering the bottom portion of the reaction vessel below the grid distribute themselves across the horizontal section of the inlet chamber below the partition, pass uniformly therethrough to the bottom of the catalyst phase and pass upwardly at uniform flow rate across the transverse dimension of the reaction zone. This effect is maximized by the essentially vertically uninterrupted surfaces confining the reactants during upward passage through the reaction zone.

Conduit means for permitting bottom drawoff of the catalyst particles is disposed coaxially within the reactant inlet conduit and detachably connected to the lower extremity thereof. Disconnection of the catalyst drawoff conduit from the extremity of the reactant inlet conduit permits its withdrawal, whereby entry is afforded to the lower portions of the reactor, permitting free access for assembly, repair and maintenance.

Figure 2:
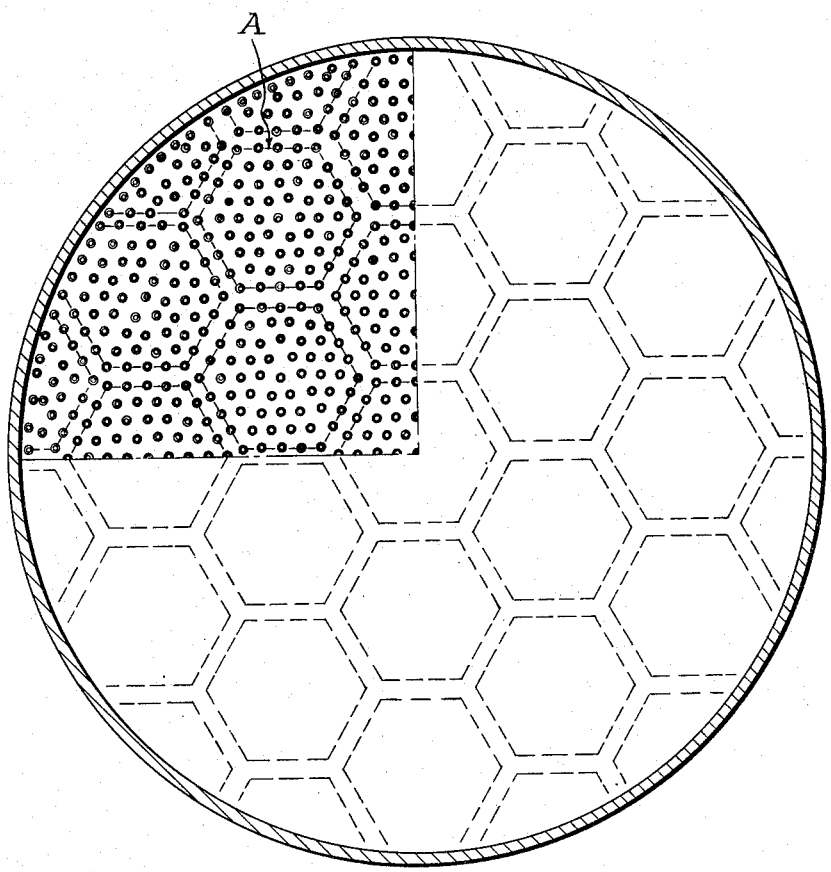
Figure 3:
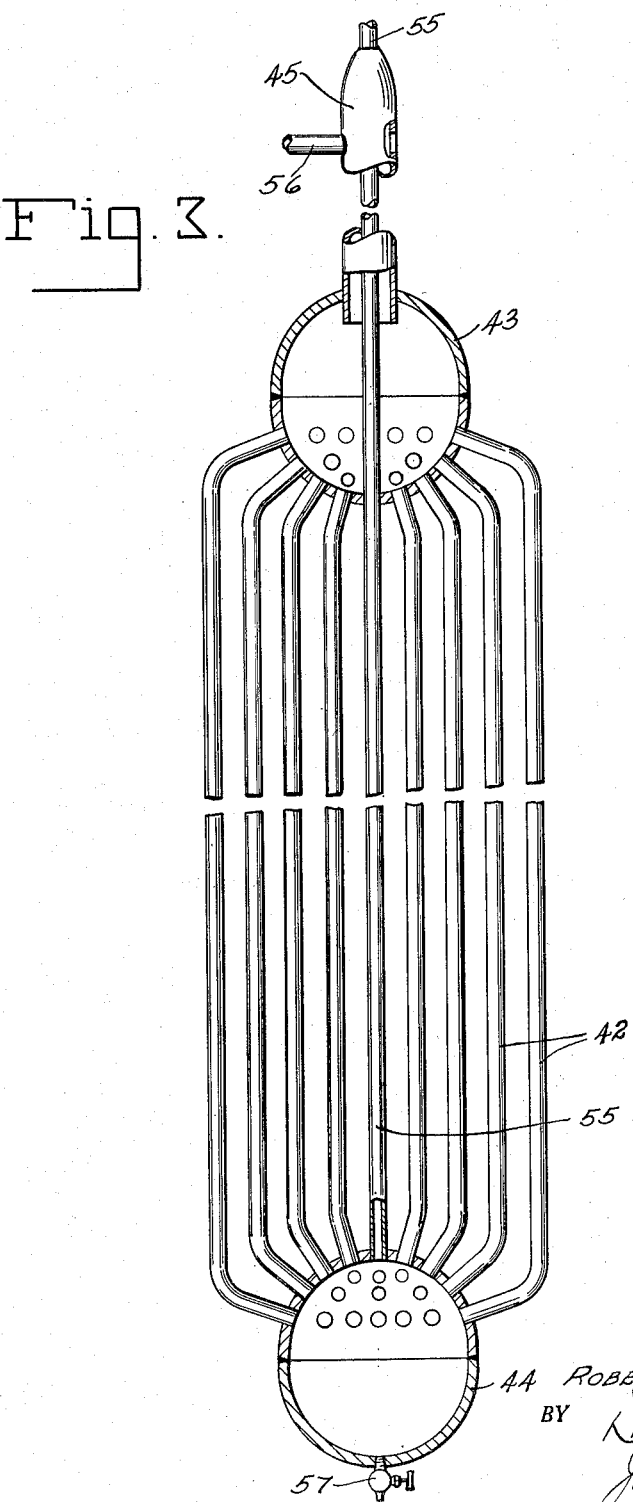

In order to describe the invention in greater detail, reference is had to the accompanying drawings, wherein Fig. 1 is an elevation mainly in section through a reactor embodying the features of the present invention; Fig. 2 is a sectional view, part in detail and part in diagrammatic form, taken on a line 2—2 of Fig. 1; and Fig. 3 is a vertical elevation, partly in section, of a somewhat modified type of tube bundle.

Referring more particularly to Fig. 1, the reactor comprises a cylindrical shell 10, enclosed at its extremities by upper and lower hemispherical domes 11 and 12, respectively.

Internally, the vessel is provided with a horizontal perforated or apertured partition 14, supporting the solid particle catalyst. Therefore, the reaction zone, strictly speaking, constitutes the chamber immediately above the partition 14 in the space occupied by the dense fluid phase catalyst, the compartment below the partition forming an entry, mixing or distribution zone for the reactant gases.

The partition 14 may comprise a plate, but is preferably composed of segmental plates which fit together to form a continuous perforated partition for support of catalyst thereabove. A plurality of spaced, radially extending ribs 15 rigidify and support the partition 14.

As above indicated, the entire surface of partition 14 is uniformly provided with closely arranged perforations or apertures, not shown, which admit the reactants upwardly into the catalyst phase.

At its periphery, the partition is provided with a downturned flange 16 resting upon an abutment 17 welded into the inner face of the reactor wall to which it is preferably bolted as at 18.

In order to adequately support the substantial load of catalyst, the radial ribs or flanges 15 of the partition 14 rest upon a pair of concentric annular supports 19 and 20. Each of the supports, as shown, is preferably formed of a length of pipe or tubing bent into the form of a closed ring. The outer supporting member 20 is, in turn, supported, as shown, upon the upper extremities of a plurality of inwardly inclined, annularly spaced struts 22, connected to the bottom of the reaction vessel as at 23, and with the supporting member 20, as at 24. Preferably, these connections are pivotal, as indicated, to accommodate normal expansive and contractive strains resulting from varying temperature conditions. U-bolts 25 embrace the tubular supporting rings 19 and 20 to rigidly clamp the partition plate 14 thereto.

The reactant feed gas enters the vertically upstanding conduit 27, through the lateral branch inlets 28 and 29, provided with flanges 30 for attachment to the feed gas source, not shown. For example, the inlets, or either of them, may receive synthesis gas from any suitable source. Alternately, one of the inlets may receive a fresh feed while the other receives a stream of recycle gas. The lower end of the reactant conduit 27 is flanged as at 31 to receive a closure or cap 32.

For the purpose of catalyst drawoff, the central portion of the partition plate 14 receives, preferably centrally thereof, a funnel-shaped receptacle or hopper 34, which may be attached thereto at its upper margin. The hopper 34 is provided, at its lower extremity, with a downwardly projecting sleeve 35 welded thereto as at 36. The sleeve 35, in turn, slidably receives a vertically extending catalyst drawoff conduit or standpipe 37. As indicated in Fig. 1, the standpipe section 37 is mounted coaxially within the cap or closure 32 covering the lower end of the reactant inlet conduit 27; therefore, by merely releasing the cover 32, the standpipe 37 is freely disengageable from sleeve 35 and may be withdrawn downwardly out of conduit 27. Since in a commercial scale embodiment, conduit 27 is of substantial internal diameter, e. g., 24 inches, it affords free access to the interior of the reactor. Such access is vital from the standpoint of assembly and repair. For example, it is available throughout assembly up to the final step, which is accomplished simply by inserting the standpipe 37 into the sleeve 35 and joining the cap 32 to the flange 31. Also, it is important in large scale, high pressure operation to avoid the structural complications of separate manways.

The catalyst may be emptied or withdrawn from the reactor at any time by removing a cover 38 at the bottom of the pipe 37, permitting the solid particle material to drain or be withdrawn as desired. Alternatively, in place of the cover 38, the standpipe may be fitted with a slide valve or other suitable valve discharging into a drawoff pipe.

Above the partition 14, the reactant stream passes upwardly through the fluid phase of catalyst and disengages therefrom at its upper surface into the space above the catalyst phase.

The product effluent stream flows into housing 39 at the upper extremity of the reactor and is withdrawn through branch line 40 for treatment and recovery of the desired products.

As indicated in the drawing, the upper surface of the catalyst phase normally rises to a level, indicated approximately by the reference numeral 41, and the catalyst phase is maintained under uniform temperature control by cooling tubes 42 immersed therein. Referring to the individual tube bundles of Fig. 1, each comprises a multiplicity of the vertically extending tubes 42, merging at their upper and lower ends respectively with headers 43 and 44.

It is to be particularly noted that the headers tend substantially to approximate the shape of a sphere with a transverse dimension at no place exceeding that occupied by the tubes of the bundle and is preferably considerably smaller. In this way, the headers individually occupy relatively small portions of the transverse section of the reactor, affording sufficient free space for the passage of the reactants thereabout.

Of important significance is exclusive structural support of each tube bundle by vertical suspension through the agency of conduit means carrying the temperature-controlling fluid which occupies the interior of the tube bundle. For example, in the case of a reactor for exothermic operations such as the catalytic synthesis of hydrocarbons from synthesis gas, hereinafter referred to for purposes of illustration, the tube bundles are supplied with a liquid coolant, as for example, water or Dowtherm (a mixture of diphenyl and diphenyl oxide). The hot vapors or liquids, as the case may be, rising in the tubes are withdrawn from the upper extremity of the tube bundle through a so-called vapor or steam tube. In the present embodiment, the vertically extending steam tube 45 extends vertically from the upper header and is suspended from the upper shell or dome 11 at the upper extremity of the reactor. Therefore, the entire weight of the tube bundle is imposed on the dome of the reactor, and acts counter to the internal pressure within the reactor.

Attachment of the steam tubes 45 to the shell, as shown in Figure 1, is accomplished through the medium of a plurality of thermal sleeves 46, permanently mounted in the dome of the reactor. It is to be noted that internal diameter of the sleeves 46 is somewhat larger than the outside diameter of the tubes 45. However, the upper extremity of each sleeve is swagged or necked down as at 47, where it is attached to the tube by a weld. Therefore, the sleeve coaxially embraces the tube in annularly spaced relation throughout most of its vertical extent.

As indicated, the tubes 45 connect with a steam drum 50 through suitable transfer lines 51. In the steam drum, entrained liquid separates from the hot vapors for recirculation to the tube bundles.

In the embodiment shown, such recirculation is accomplished by entering lower headers 44 from an outside header or manifold 53. In turn, a branch line 54 from the header 53 connects with a downcomer, not shown, which connects with the steam drum 50, as at 48. In this manner, provision is made for constant circulation of cooling liquid from the steam drum 50 into the lower headers 44 and up through the tubes 42, the resulting vapors and entrained liquid rising through steam tubes 45 for continual separation in drum 50. Steam or other vapor thus made is withdrawn for process use through a suitable conduit, not shown.

Particular attention is directed to the fact that liquid tubes 52 are relatively small, flexible lines which extend through expansion patterns after leaving the respective headers 44. Therefore, these tubes perform no supporting function as regards the respective tube bundles and, in fact, flex freely to permit upward and downward translation of the headers 44 under the influence of the expansive and contractive strains caused by temperature changes encountered in operation. The tubes 52 pass freely through the partition plate 14 to avoid any vertical stress upon this member at any time.

A somewhat modified form of tube bundle which is equally effective in accomplishing the foregoing objectives is disclosed in Fig. 3, wherein similar parts are given similar identification numerals as in Fig. 1. In this embodiment, the coolant supply tube, instead of joining the bottom of the lower header 44 connects therewith at its upper extremity, preferably on the vertical axis thereof and extends vertically as at 55, passing completely through the upper header 43 and coaxially through the interior of steam tube 45. The steam tube as before, acts as the vertical suspension member for the tube bundle. The incoming coolant liquid flows downwardly through tube 55 to the lower header and the upflowing vapors pass through the annular space between tubes 45 and 55.

Steam tube 45 is closed at its upper end and is provided with a branch pipe 56 above the reaction vessel, which connects with the steam drum as before. Water tube 55 is connected to the lower portion of the steam drum 50 to form a downcomer, as before. A drawoff cock 57 may be provided at the bottom of lower header 44 for drainage or sediment blowoff.

With particular regard to Fig. 2 of the drawing, it is to be noted that the margin of each of the bundles follows an equal-sided hexagonal pattern designated by the dashed-line polygon identified by the letter A. In other words, the vertical axis of each of the marginal tubes is disposed along the hexagonal pattern, in equidistant relation to the adjacent tubes. The remaining tubes are distributed uniformly throughout the interior of the pattern.

This has the manifest advantage that all of the tubes in the reactor may have equal spacing from adjacent tubes thus permitting uniform disposition of the tubes across the entire cross-section of the reactor. In contrast, it will be apparent that tube bundles having a cylindrical periphery could not be nested so as to realize this desired uniformity of tube distribution.

It also has the special advantage of facilitating disassembly of the tube bundles from the reactor. For example, after lifting the central tube bundle vertically through the housing, removal of any adjacent tube bundle is effected by cutting off its steam tube 45 just below the respective thermal sleeve 46, and shifting the immediate adjacent bundles laterally a short distance. This affords sufficient clearance to permit the selected tube bundle to move into the center of the reactor and be withdrawn vertically through the housing 39. In this manner, the entire interior cooling assembly may be withdrawn or replaced.

Housing 39, as indicated, is provided with a removable cover 59, normally bolted in place, as at 60 and is ample in size to accommodate passage of any tube bundle.

From the foregoing, it is apparent that the present reactor provides a structure which is susceptible of easy construction and assembly in all its details and which enables ready access for repair and operating maintenance.

Moreover, it is ideally adapted to large scale, high pressure (e. g., 200–600 p. s. i. g.) fluid processes involving high temperatures, as for example, from 500–700° F., and above, as in the conversion of synthesis gas comprised of hydrogen and carbon monoxide into desired liquid hydrocarbons and the like.

It is contemplated, of course, that the lower and also the upper extremities of the reactor may be frustoconical in shape rather than hemispherical. Likewise, it is permissible to dispose upon the upper surface of the perforated partition plate 15 a layer of coarse, broken, solid material to effect maximum dispersion of the entering feed gases into the catalyst mass thereabove. In such cases, the inert solid material may rise to the lower or even to the upper portions of the headers 44, so that the fluid catalyst mass occupies the region about tubes 42, where the flow of gases is confined and directed by the vertical surfaces of the tubes and the shell 10.

Many other modifications and variations of the invention above set forth may be made without departing from the spirit and scope thereof, as will be apparent to those skilled in the art from the foregoing, and therefore, only such limitations should be imposed as are indicated in the appended claims.

I claim:

1. In a reactor comprising a vertically extending vessel, means for introducing a stream of reactant gas to the lower portion of said vessel, means for withdrawing the fluid products of reaction from the upper portion thereof and means for regulating the temperature within said vessel comprising a plurality of tube bundles disposed in said reactor and adapted to contain a temperature control fluid, each of said tube bundles comprising spaced upper and lower headers, a plurality of vertically extending tubes between said headers and a vertically extending conduit for said temperature control fluid extending from said upper header and connecting with the upper extremity of said reaction vessel as the support for suspending the tube bundle within said vessel, a feed pipe for the temperature control fluid connecting with said lower header, said feed pipe extending upwardly through said upper header and passing vertically and centrally through said conduit to a point beyond the upper extremity of said vessel.

2. A reactor according to claim 1 including an apertured grid plate extending across said vessel near the lower portion thereof for distributing reactant gas thereto, a solid particle drawoff receptacle set in said partition and extending downwardly therefrom, said receptacle terminating in a vertically extending sleeve and a drawoff standpipe releasably connected to the lower portion of said vessel and having its upper extremity slidably engaged within said sleeve.

3. A reactor according to claim 1 including a transversely extending partition in said vessel below said lower headers, said partition being provided with spaced perforations adapted to distribute an upflow of gas uniformly therethrough, an inlet conduit extending into said vessel below said partition for introducing a stream of reactants into the lower portion of said vessel, said inlet conduit having a laterally extending feed pipe, and having a removable cover for its outer extremity, a solid particle drawoff standpipe of substantially smaller diameter than said conduit, mounted in said removable cover extending coaxially therethrough, and communicating with the chamber above said transverse partition to receive solid particle material therefrom, said drawoff standpipe being slidably disconnectible from said partition and thereby freely removable from the reactor by removing said inlet conduit cover.

4. A reactor according to claim 1 wherein said feed pipe is supported by the upper portion of said conduit.

5. A reactor according to claim 1 wherein said conduit and said feed pipe connect with a separating drum exterially of said vessel.

6. In a reactor comprising a vertically extending vessel, means for introducing a stream of reactant gas to the lower portion of said vessel, means for withdrawing the fluid products of reaction from the upper portion thereof, and means for supporting a mass of fluid contact material within said vessel comprising an apertured gas distributing member extending across the vessel at the lower portion thereof, a draw-off receptacle mounted in said member and extending downwardly therefrom, a draw-off standpipe releasably connected to the lower portion of said vessel and having its upper extremity slidably engaged with the lower portion of said draw-off receptacle and thereby freely separable from said receptacle when the standpipe is released from said vessel.

7. In a reactor comprising a vertically extending vessel, means for introducing a stream of reactant gas to the lower portion of said vessel, means for withdrawing fluid products of reaction from the upper portion thereof, and means for supporting a mass of fluid contact material within said vessel comprising an apertured gas distributing partition extending across the vessel at the lower portion thereof, said partition being provided with spaced perforations adapted to distribute an upflow of gas uniformly therethrough, the aforesaid means for introducing the reactant gas into the lower portion of said vessel comprising an inlet conduit entering said vessel below said partition and having a removable cover at its outer extremity, a draw-off standpipe of substantially smaller diameter than said conduit mounted in said removable cover, extending centrally through said conduit and communicating with the space above said partition to receive solid particle material therefrom, said draw-off standpipe being slideably connected with said partition and, therefore, readily removable from the reactor by removing said conduit cover.

ROBERT LOUIS MAYHEW.

References Cited in the file of this patent

UNITED STATES PATENTS

| Number | Name | Date |
|---|---|---|
| 2,481,089 | Dickinson | Sept. 6, 1949 |
| 2,518,270 | Barr | Aug. 8, 1950 |
| 2,527,846 | Phinney et al. | Oct. 31, 1950 |